(12) United States Patent
Utsu

(10) Patent No.: US 6,916,241 B2
(45) Date of Patent: Jul. 12, 2005

(54) REARING GAME APPARATUS

(75) Inventor: Eiji Utsu, Tokyo (JP)

(73) Assignee: Wiz Co., Ltd., Tokyo (JP)

( * ) Notice: Subject to any disclaimer, the term of this patent is extended or adjusted under 35 U.S.C. 154(b) by 0 days.

(21) Appl. No.: 10/747,226

(22) Filed: Dec. 30, 2003

(65) Prior Publication Data

US 2005/0054401 A1 Mar. 10, 2005

(30) Foreign Application Priority Data

Sep. 4, 2003 (JP) ....................................... 2003-313190

(51) Int. Cl.[7] .............................................. G06F 17/00
(52) U.S. Cl. ............................................ 463/1; 463/43
(58) Field of Search ......................... 463/1, 10, 30–32, 463/37, 40, 42–44

(56) References Cited

U.S. PATENT DOCUMENTS 6,251,012 B1 * 6/2001 Horigami et al. .............. 463/7

2003/0216160 A1 * 11/2003 Yokoi .............................. 463/1

* cited by examiner

Primary Examiner—Kim Nguyen
(74) Attorney, Agent, or Firm—Swidler Berlin LLP

(57) ABSTRACT

The present invention comprises a display means for displaying a rearing information on a display according to the game progress conditions; an input means for a player inputting player's operations; a storage means for storing information of which the game progress conditions, a rearing character, graphics and temporary information; an environment set up means for said player setting rearing environment of characters freely; a connection means for connecting with the doll body including a storage means. In said environment set up means, when said player starts to play, the player connects the doll body with said connection means and make to communicate with the game apparatus. Parameters such as ability points and skill stored in said doll body change by various environment. Therefore, said player can rear own character by said environment set up.

4 Claims, 16 Drawing Sheets

| NO. | Environment name | Kind | Attribute | Temperature | Humility | Amount of light |
|---|---|---|---|---|---|---|
| 1 | Dryness area | | Fire | High | low | |
| 2 | Desert area | Dryness | Fire | Very high | Very low | |
| 3 | Crater of volcano | | Fire | Extremely high | Extremely low | |
| 4 | The tropics | | Earth | High | High | |
| 5 | The rainforest | Tropics | Earth | Very high | Very high | |
| 6 | The ground bottom | | Earth | Extremely high | Extremely high | |
| 7 | The frigid area | | Water | Low | High | |
| 8 | The extreme frigid area | Frigid | Water | Very low | Very high | Daytime on |
| 9 | Absolutely, zero | | Water | Extremely low | Extremely high | |
| 10 | High land | | Wind | Low | low | |
| 11 | Mountain | Highlands | Wind | Very low | Very low | |
| 12 | The stratosphere | | Wind | Extremely low | Extremely low | |
| 13 | The temperate plane | Planes | Earth | A little high | A little high | |
| 14 | The frigid plane | | Water | A little high | A little high | |
| 15 | Broad leaf trees | Woods | Fire | A little low | A little low | |
| 16 | Tundra | | Wind | A little low | A little low | |
| 17 | Shoat (The south sea) | | Water | A little high | Extremely high | High |
| 18 | The ocean (The south sea) | | Water | A little high | Extremely high | Low |
| 19 | The deep sea (The south sea) | Water | Water | A little high | Extremely high | Zero |
| 20 | Shoat (The north sea) | | Water | A little low | Extremely high | High |
| 21 | The ocean (The north sea) | | Water | A little low | Extremely high | Low |
| 22 | The deep sea (The north sea) | | Water | A little low | Extremely high | Zero |

The environment changes by "Temperature", "Humility" and "Amount of light".
The environment includes 22 kinds and 7 categories.
Note: These set up values change by "Time" condition.

FIG.6

The followings are executed by commands at only Talisdam.

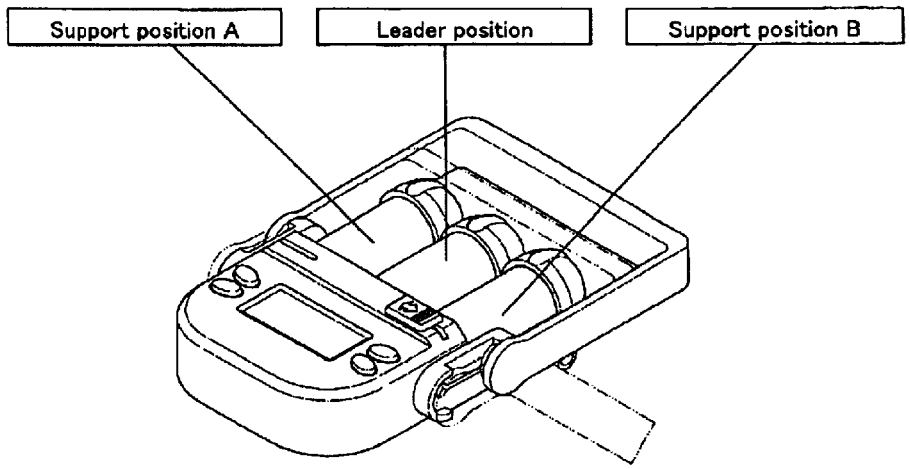

■ Turn a new life

The life front ability of death is succeeded by another character, and reborn.
Base of turn a new life: Death character A is attached Support position A.

|  | HP | Magic attack | Strike attack | Counter | Healing | light attack | Darkness attack |
|---|---|---|---|---|---|---|---|
| before death | 6000 | 700 | 600 | 500 | 300 | 150 | 400 |

After turn a new life: Character B is attached leader position.

|  | before death | Magic attack | Strike attack | Counter | Healing | light attack | Darkness attack |
|---|---|---|---|---|---|---|---|
| After turn a new life | 80 | 15 | 10 | 20 | 10 | 0 | 0 |
| Without turn a new life | 680 | 85 | 70 | 70 | 40 | 15 | 40 |

New character succeeds 1/10 parameters from death character.

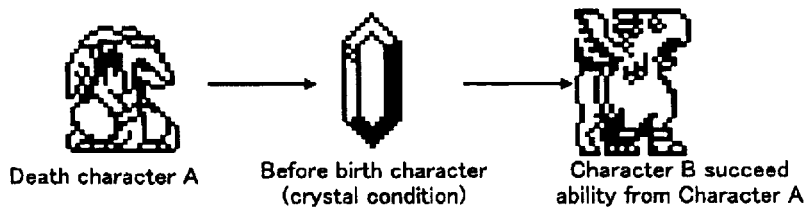

Death character A     Before birth character     Character B succeed
                      (crystal condition)        ability from Character A

FIG.8

■ Succession
A leader character can succeed ability from two other characters.
Return two characters to crystal.
|  | Class |
|---|---|
| Character A | 2 |
| Character B | 4 |
After succession
|  | Class |
|---|---|
| Character C | 6 |
\* After succession, character A,B return to crystal.(Death)
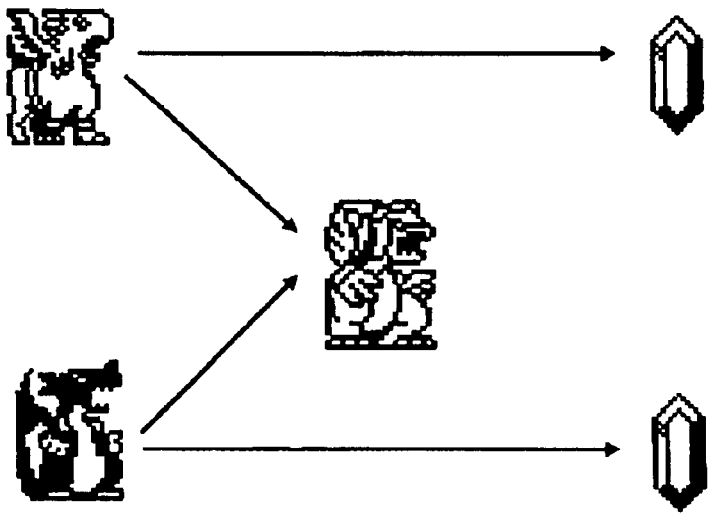
FIG.9

☐Weapon Mode:
    In the case of executing weapon mode to living character, new [Attack panel] can be set.
    A character which changed weapon mode, is dead. (is returned to a crystal)

☐Skill list obtained for weapon mode (attached to support position)

| NO. | Skill | Learned skill effect |
|---|---|---|
| 7 | Seal skill 1 | Seal Level 1 skill |
| 8 | Seal skill 2 | Seal Level 2 skill |
| 9 | Seal skill 3 | Seal Level 3 skill |
| 10 | Seal skill 4 | Seal Level 4 skill |
| 11 | Seal skill 5 | Seal Level 5 skill |
| 12 | Seal skill 6 | Seal Level 6 skill |
| 13 | Instantaneous death skill 1 | Give instantaneous death in probability 1/32 |
| 14 | Instantaneous death skill 2 | Give instantaneous death in probability 1/16 |
| 15 | Instantaneous death skill 3 | Give instantaneous death in probability 1/8 |
| 16 | Absorption skill 1 | Absorb magic power from enemy |
| 17 | Absorption skill 2 | Absorb counter power from enemy |
| 18 | Absorption skill 3 | Absorb strike power from enemy |
| 19 | Absorption skill 4 | Absorb healing power from enemy |
| 20 | Decline skill 1 | Make to decrease enemy's magic power |
| 21 | Decline skill 2 | Make to decrease enemy's counter power |
| 22 | Decline skill 3 | Make to decrease enemy's strike power |
| 23 | Decline skill 4 | Make to decrease enemy's healing power |
| 24 | Destroy skill 1 | Destroy magic skill |
| 25 | Destroy skill 2 | Destroy counter skill |
| 26 | Destroy skill 3 | Destroy strike skill |
| 27 | Destroy skill 4 | Destroy healing skill |
| 28 | Destroy skill 5 | Destroy light skill |
| 29 | Destroy skill 6 | Destroy darkness skill |
| 30 | Four times continuance skill | Execute four times continuance attack |
| 31 | Eight times continuance skill | Execute eight times continuance attack |
| 32 | Fire dragon lord skill | Destroy gage |
| 33 | Wind dragon lord skill | Decrease HP to half |
| 34 | Earth dragon lord skill | Give damage at random |
| 35 | Water dragon lord skill | Destroy command |
| 36 | Light dragon lord skill | Hide command name |
| 37 | Darkness dragon lord skill | Give instantaneous death in probability 1/4 |

FIG.10

Skill list ①

| NO. | Skill name | Detail | Note |
|---|---|---|---|
| 0 | Mistake | Make to skip "Attack turn" by behavior mistake | Cannot learn by training |
| 1 | Small attack | Attack by 1/3 of strike attack power | Cannot learn by training |
| 2 | Middle attack | Attack by 2/3 power of strike attack power | Cannot learn by training |
| 3 | Strike attack | Attack by of strike attack power | Earth attribute good attack |
| 4 | Magic attack | Attack by of Magic attack power | Fire attribute good attack |
| 5 | Light attack | Give 1.2 times damage to darkness attribute by magic power | Light attribute good attack |
| 6 | Darkness attack | Give 1.2 times damage to fire, earth, wind and water attribute by magic power | Darkness attribute good attack |
| 7 | Counter attack | Reflect magic attack | Wind attribute good attack |
| 8 | Healing magic | Heal HP by healing magic power | Water attribute good attack |

FIG.11

☐ The player selects 3 commands from 15 commands list per turn; compares command with enemy; executes a battle.

The player character and enemy execute commands alternatively.

| Command list | Skill |
|---|---|
| 1 | Magic Lv 1 |
| 2 | Small attack |
| 3 | Small attack |
| 4 | Healing Lv 1 |
| 5 | Counter Lv 1 |
| 6 | Change Environment: Plane |
| 7 | Small attack |
| 8 | Small attack |
| 9 | Light attack Lv 1 |
| 10 | Magic Lv 2 |
| 11 | Healing Lv 1 |
| 12 | Small attack |
| 13 | Small attack |
| 14 | Counter Lv 1 |
| 15 | Magic Lv 1 |

The player character executes shift element attack by combination of commands.

The player cannot select command that has already been selected, after next turn. The fight has been executed

| Command list | Skill |
|---|---|
| 1 | Magic Lv 1 |
| 2 | Small attack |
| 3 | Small attack |
| 4 | Healing Lv 1 |
| 5 | Counter Lv 1 |
| 6 | Change Environment: Plane |
| 7 | Small attack |
| 8 | Small attack |
| 9 | Light attack Lv 1 |
| 10 | Magic Lv 2 |
| 11 | Healing Lv 1 |
| 12 | Small attack |
| 13 | Small attack |
| 14 | Counter Lv 1 |
| 15 | Magic Lv 1 |

FIG.12

■Skill support
The player character can receive the following support
by attribute of attached character to support position.

| Attribute | Fire | Earth | Wind | Water | Light | Darkness |
|---|---|---|---|---|---|---|
| Support kind | Magic attack | Strike attack | Counter | Healing magic | Light attack | Darkness attack |

For Example:
Leader: Magic attack power 300, Healing magic power 300
Support A: Fire attribute, Magic attack power 200
Support B: Water attribute, Healing magic power 150
In the case of above, when the leader executes magic attack,
the support characters execute magic attack (300+200) at the same time.
In the case of healing power, it is (300+150).

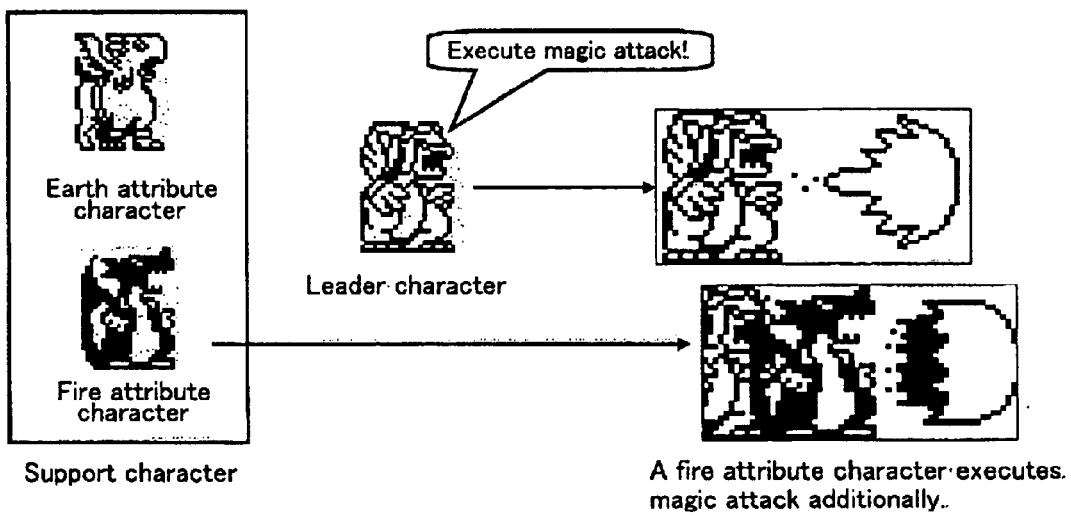

FIG.13

| Environment NO | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Name | Dryness area | Desert area | Crater of volcano | The tropics | The rainforest | The ground bottom | The frigid area | The extreme frigid area | Absolutely, zero | High land | Mountain | The stratosphere | The temperate plane | The frigid plane | Broad leaf trees | Tundra |
| NO | | | | | | | | | | | | | | | | |
| 1 Salamander | A | B | B | C | C | C | D | D | D | C | C | C | C | D | B | C |
| 2 Burn dragon | | | | | | | | | | | | | | | | |

| | 17 | 18 | 19 | 20 | 21 | 22 | Just noon | | | Just morning/ evening | | | Just night | | |
|---|---|---|---|---|---|---|---|---|---|---|---|---|---|---|---|
| | Shoat (The south sea) | The ocean (The south sea) | The deep sea (The south sea) | Shoat (The North sea) | The ocean (The north sea) | The deep sea (The north sea) | Temperature | Humility | Amount of light | Temperature | Humility | Amount of light | Temperature | Humility | Amount of light |
| | D | D | D | D | D | D | 25 | 5 | 5 | 30 | 5 | 5 | 35 | 5 | 0 |

A: Best
B: Good
C: Middle
D: Bat

FIG.14

☐Team ability
When three characters are reared together, they learn team skill that they use fight together.
Only the characters combination (team) can use own team ability.

☐Team ability list

| NO. | Monster name | Skill effect |
|---|---|---|
| S1 | Win dragon | Reflect magic attack in probability 10% |
| S2 | Burn dragon | |
| S3 | Big foot | |
| S4 | Griffin | |
| S5 | Win dragon (Strengthening) | |
| S6 | Mermaid | Leader's HP is healed 5% / turn |
| S7 | Werewolf | |
| S8 | Will o wisp | |
| S9 | Wind dragon lord | |
| S10 | Burn dragon | Leader's magic power increase + 5% |
| S11 | Goblin | |
| S12 | Yeti | |
| S13 | Fire giant | |
| S14 | Fire dragon lord | |
| S15 | Changed P win dragon | When a leader is win dragon, execute double attack |
| S16 | Changed P burn dragon | |
| S17 | Changed P big foot | |
| S18 | Changed P Griffin | |
| S19 | Peryton | |
| S20 | Troll | |
| S21 | Command win dragon | |
| S22 | Command win dragon (Strengthening) | |
| S23 | Manticore | |
| S24 | Devour crocodile | |
| S25 | Carbuncle | |
| S26 | Water dragon lord | |
| S27 | Command burn dragon (Strengthening) | |
| S28 | Wyvern | Cut by half damage from earth attribute in probability 25% |
| S29 | Dwarf | |
| S30 | Skeleton | |

FIG.15

■The player can rear own character stronger by pin point environment.
The player can set environment more detail by Talisdam than Talispod
By each characters being set up "pin point environment",
they can be reared faster and stronger than by Talispod.

For example

| Set up parameter | Pin point | Best | Middle | Bat |
|---|---|---|---|---|
| Temperature | 100 | Volcano | Desert | Except described left |
| Humility | 0 | | | |
| Amount of light | 40 | | | |

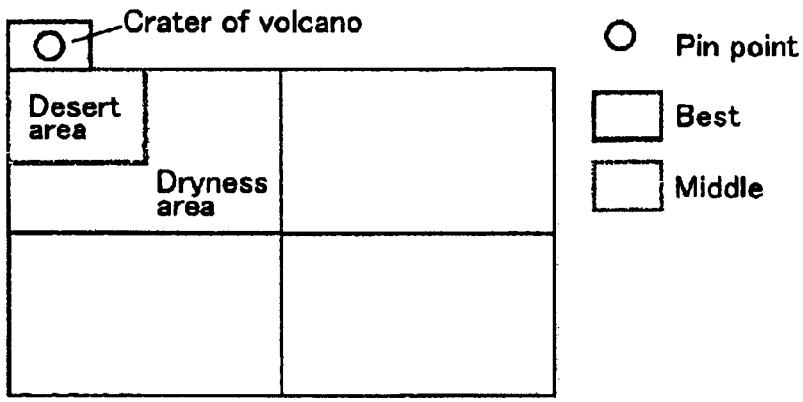

FIG.16

REARING GAME APPARATUS

BACKGROUND OF THE INVENTION

1. Field of the Invention

The present invention relates to a rearing game apparatus.

2. Description of the Related Art

Conventionally, as showing to the Japanese laid-opened official gazette 10 (1998)-232595, an example of the conventional electronic games is a rearing simulation apparatus in which a player responds to and deals with appeals or requests from an imaginary living body displayed on the screen to take care of or train the imaginary living body for growing the same. In addition, a game apparatus which according to make a player's character fight with other players' character, and also make the player's character grow by above fighting result has been disclosed except above rearing game apparatus.

However, the electronic game provided no further dramatic effect, and therefore there have been demands from the players for development of a rearing simulation apparatus provided with dramatic effects with which playing pleasure can further increase.

To this end, the present invention was made in view of the situation provided by the conventional game apparatus and an object thereof is to provide a rearing game apparatus in which a player rears by changing rearing environment and also, rears a plurality of characters at the same time.

SUMMARY OF THE INVENTION

The present invention comprises a display means for displaying a rearing information on a display according to the game progress conditions; a input means for a player inputting player's operations; a storage means for storing information which of the game progress conditions, a rearing character, graphics and temporary information; an environment set up means for a player setting rearing environment of characters freely; a connection means for connecting with the doll body including a storage means. In said environment set up means, when a player starts to play, a player connects the doll body with said connection means and make to communicate with the game apparatus. Parameters such as ability points and skill stored in a doll body change by various environment. Therefore, a player can rear own character by said environment set up.

According to the first aspect of the present invention, the rearing game apparatus comprising a plurality of said connection means with the doll body, and the player can rear a plurality of characters at the same time according to connections with the plurality of characters.

According to the second aspect of the present invention, the player can change parameters of the plurality of characters such as adding new skill and changing ability point of them by depending on combinations of the plurality of characters and simultaneous rearing terms of them.

According to the third aspect of the present invention, the player can use the added skill of the characters at the time of battle, when the player use the same combinations of the plurality of characters as the rearing combinations.

In addition, according to a fourth aspect of the present invention, the rearing game apparatus includes connection means for connecting with other same type game apparatus and the players can make own character to fight against parameters of a doll body connected with the other same type game apparatus, as a opposite character.

According to the first aspect of the present invention, the doll body is connected by a connection means and communicated parameters with the rearing game apparatus. The parameters such as ability points or skill change by the environment set up. A player rears own character by using the parameters as own character. In zoo, animals usually are reared in each proper environment. In this game, a player enjoys looking for proper environment for own character by trial and error. This environment set up is set by amount of water, temperature, amount of light, time, etc.; a player can set various environment. For example, when amount of water is low and temperature is high, the environment is dryness area. In the case a character likes the dryness, ability points of the character is increased. Otherwise, the character dislikes the dryness the ability points decrease. In addition, the character learns skill by rearing result.

According to the second aspect of the present invention, a player can rear a plurality of doll bodies at the same time by connecting them with each connection means comprised in the game apparatus and by setting environment. Wherein, the environment set up generates only one environment for a plurality of characters. As it is difficult to generate the best proper environment for all character, the player enjoys looking for the best combination of own characters.

According to the third aspect of the present invention, the ability points of player characters are increased or decreased by rearing present/past combinations and total/past rearing time. As the result, a plurality of characters can learn "skill" and "team skill" as ability.

According to the fourth aspect of the present invention, a player can make own characters to use the "skill" learn by rearing results at the time of the battle. The "skill" are various such as healing and attacking an enemy character.

According to the fifth aspect of the present invention, The rearing game apparatus as set forth in claim 1, comprising a connection means for connecting with other same type game apparatus comprising one and more connection for connecting with the doll body; communication means parameters between the apparatuses, wherein the player makes own character to fight against parameters of the doll body connected with the other same type game apparatus, as a opposite character.

BRIEF DESCRIPTION OF THE DRAWINGS

The invention will be better understood from reading the description which will follow, which is given merely by way of example and made with reference to the appended drawings, in which:

FIG. 6 shows that environment can be set in a environment set up means in the present invention;

FIG. 8 shows "Reborn mode" in a soul link in the present invention;

FIG. 9 shows "Succession mode" in a soul link in the present invention;

FIG. 10 shows "Weapon mode" of a soul link in the present invention;

FIG. 11 shows a skill list that a character can use at the time of battle in the present invention;

FIG. 12 shows a image diagram at the time of battle in the present invention;

FIG. 13 shows support skill among a plurality of doll bodies at the time of battle in the present invention;

FIG. 14 is a table which shows aptitude of doll bodies for environment in the present invention;

FIG. 15 is a table which shows team ability of a plurality of doll bodies at the time of battle in the present invention;

FIG. 16 shows a rearing diagram at a pinpoint environment in the present invention;

DETAILED DESCRIPTION OF THE INVENTION

According to the present invention, there is provided a rearing game apparatus comprising a display means for displaying a rearing information on a display according to the game progress conditions; an input means for the player inputting player's operations; a storage means for storing information which of the game progress conditions, a rearing character, graphics and temporary information; an environment set up means for the player setting rearing environment of characters freely; a connection means for connecting with the doll body having a storage means.

DESCRIPTION OF THE PREFERRED EMBODIMENT

Figure 1:
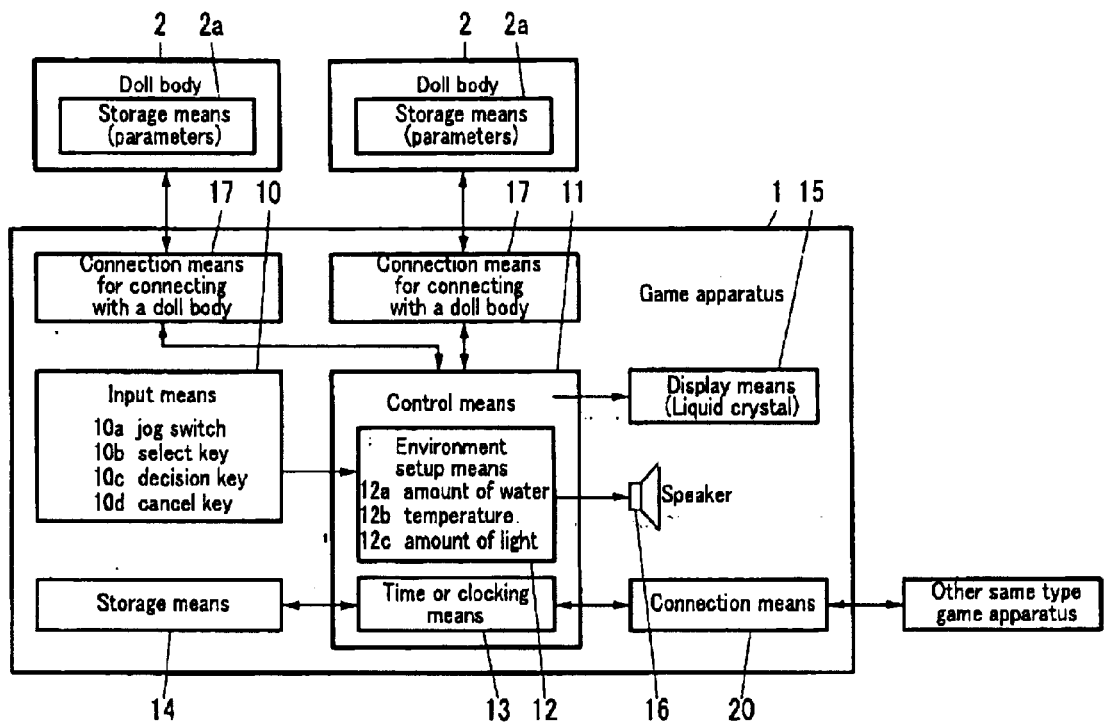
FIG. 1 is a block diagram showing an embodiment in the present invention.
Figure 2:
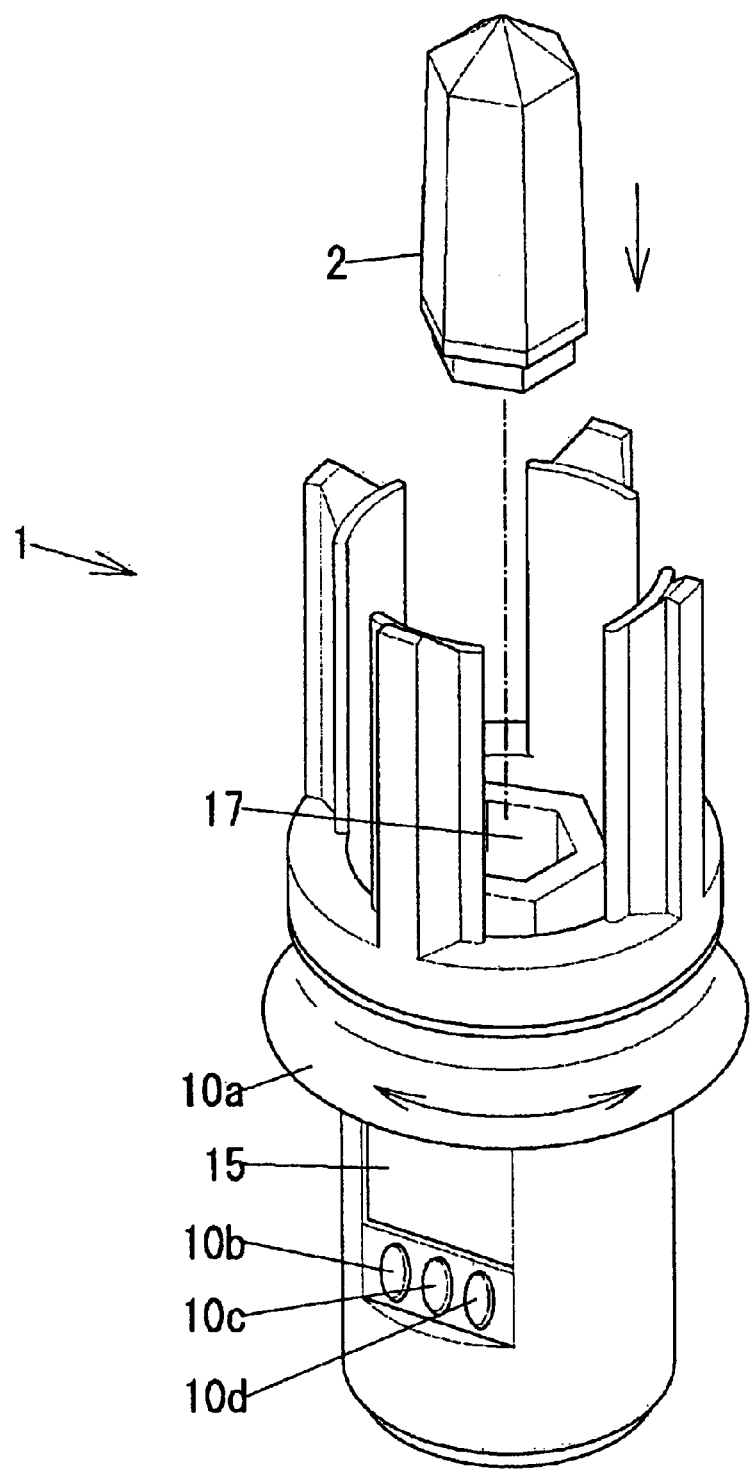
FIG. 2 shows the game apparatus which can be connect with the doll body as an embodiment in the present invention.
Figure 3:
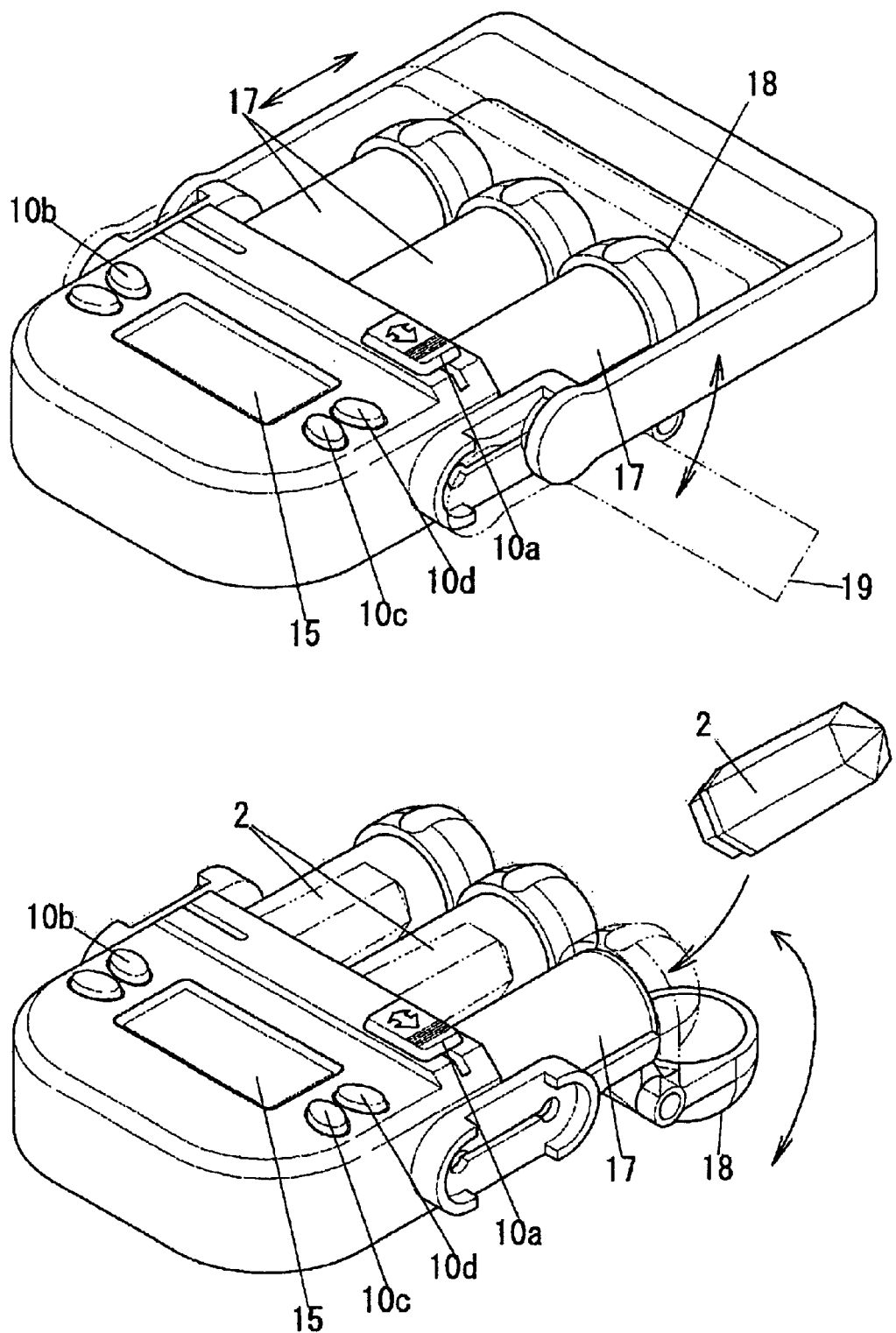
FIG. 3 shows the game apparatus which can be connect with three doll bodies as an embodiment in the present invention

An embodiment of the present invention will be described in detail below with reference to the appended drawings. FIG. 1 is the block diagram showing an embodiment in the present invention. FIGS. 2 and 3 are game apparatus embodiments in the present invention. FIG. 2 shows the game apparatus comprising a connection means for connecting with the doll body, on the other hand FIG. 3 shows the game apparatus comprising three connection means.

The block diagram and the game apparatus of a rearing game will be explained by FIG. 1 to 3. The game apparatus comprises a connection means for connecting with the doll body is called as "Talispod"; the game apparatus comprising three connection means is called as "Talisdam".

The doll body 2 which comprise a storage means 2a inside does reading/writing and communicates information within the storage means 2a by connecting with the game apparatus 1. The doll body 2 which is formed a hexagon pillar with transparent resin outside, stores inside the doll thing modeling such as animals, virtual living body, human being, characters and robots. The player can enjoy imaging parameter information within the storage means, and collecting by looking the doll thing.

Some parameters are stored in the storage means 2a. The parameters include ID, user registered name, class, final access time, HP (base and present), magic offense point (base and present), counter offense point (base and present), heal point (base and present), code number of learned skill, etc. The ID that is a rearing character number corresponds to the doll thing of the doll body 2. On the other hand, User registered name is the player named own character. In addition, class is raising rank with the game progress.

The number of the base point as the parameter is fixed numerical value, and it does not change with the game progress. The base point is capable of rewriting and the player can recover initial condition by the base point, however rearing data is lost by a data destroyed. In addition, if the player fails to rear, the player can start from the beginning by recovering parameters to the initial condition. The player can use level, strength, magic point, offense, defense, agility, cleverness, charm, intelligence, spirit, humor, rearing, satisfaction, character name, race (kind), etc. as the parameters.

The game apparatus comprises an input means 10, a control means 11, an environment set up means 12, a timer or clocking means 13, a storage means 14, a display device 15, a speaker 16, a connection means 17 for connecting with the doll body and a connection means 20.

The input means comprises a jog switch 10a, a select key 10b, a decision key 10c and a cancel key 10d.

The jog switch 10a that changes game mode to play mode, is changed when the doll body 2 is attached or removed. The player can attach or remove the doll body 2 smoothly by using the switch. The player can change choices by the select key 10b when the choices are displayed. The player can select a choice and proceed next display by the decision key 10c, when choices, etc. are displayed. In addition, the player can proceed next display by the decision key 10c, when the display is paused.

The control means 11 can control all function of the rearing game apparatus.

Figure 7:
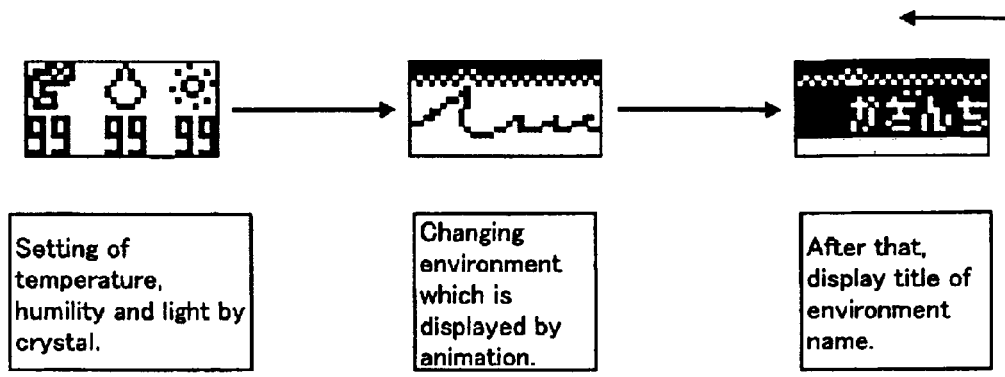
FIG. 7 shows that the player sets environment in a environment set up means in the present invention.

The player can set amount of water 12a, temperature 12b and amount of light 12c in the environment set up means. Setting the amount of water 12a, temperature 12b and the amount of light 12c can provide the most suitable environment for own characters. In total 22 kind of environment can be generated by the combination of setting mentioned above. For example, when the temperature is set "high", humility is set "low" and the amount of light is set "option", the environment of dryness zone is generated as shown in the FIG. 6. On the other hand, when the temperature is set "a little low", the humility is set "maximum" and the amount of light is set "minimum", environment of the deep sea (The North Sea) is generated. In addition, the table in FIG. 6 changes a little with present time clocked by the timer or clocking means 13, and it provides the pleasure for finding the change to the player. FIG. 7 shows the display of environment set up, for example set temperature data changes to a numerical value as −273 to 999 degree C., in the case of the amount of water, the numerical value ranges 0 to 100%. And also, these parameter which can be set roughly as "0", "very low", "low", "normal", "high", "very high", "maximum", etc., help an unskilled player playing.

The timer or clocking means 13 always clocks the flow of time. The player inputs present time to the timer or clocking means comprised within the game apparatus and have clocked when the player starts to play. Time flows between the player and the game are corresponded, whereby the player can set Lip carefully environment for own character. In the case a player time flow is not corresponded with the game time flow, for example the player cannot set up carefully environment well at night though the game time is noon. In described above, it is helpful a player to rear own character carefully.

In the embodiment, the flow of time is divided four time compositions as "morning", "noon", "evening" and "night". The "night" time composition is longest, though the "morning" and "evening" are shorter. As the "morning" and "evening" are composed to one time composition, three of time synthesize "night", "morning plus evening", "noon"

affect the game time. As players sleep at knight, the rearing result of the "night" environment set up allows affecting only a little.

The storage means 14 storages that the game progress condition, information and image about the rearing character and temporary information. When the player starts to play, parameters that are read from the storage means 2 inside the doll body 2, are stored in the storage means 14. When the ability points and the skill of the character change in the game progress condition, the parameters of the storage means 2a in the doll body 2 are renewal. In addition, when the parameters are read from the storage means 2a, an image corresponding with the ID are stored inside the storage means 14 in advance, the image are displayed by the display means 15.

The display means 15 displays the game progress condition. In an embodiment, the display means 15 displays by a liquid crystal display. In other means, a dot matrix type, LED, a cold cathode lay display, etc. can be used. The speaker outputs voices with the game progress condition.

The connection means 17 for connecting with the doll body is connected with the doll body 2, and communicates parameters stored in the doll body 2. For example, the doll body 2 comprises a luminous body, when the parameters are communicated with the storage means 2a, the luminous body that is illuminated by power supply can prevent the player removing the doll body and data damaging, and also improves stage effect.

The connection means 20 for connecting with other same type rearing game apparatus comprising one and more connection means for connecting with the doll body. The bodies of rearing game apparatus can be connected directly, wired, or non-wired means. When each connection means of game apparatuses, players can make to fight them characters in the doll body connected with the game apparatus with each other. After fighting, the fighting result is stored in the each storage means 2a inside the doll body 2. In addition, increase and decrease of ability points and leaning skill are stored in the storage means 2a.

The game apparatus described in FIG. 3 comprises a plurality of connection means for connecting with the doll body 17. The game apparatus comprises a cover 18 which prevent the doll body 2 from removing after the doll body attached to the connection means 17. A player rotates the cover 18 and opens a connection mouth. Next, after connecting the player rotates the cover 18 and closes the connection means 17. In addition, the game apparatus has a handle in order to the player carry.

Figure 4:
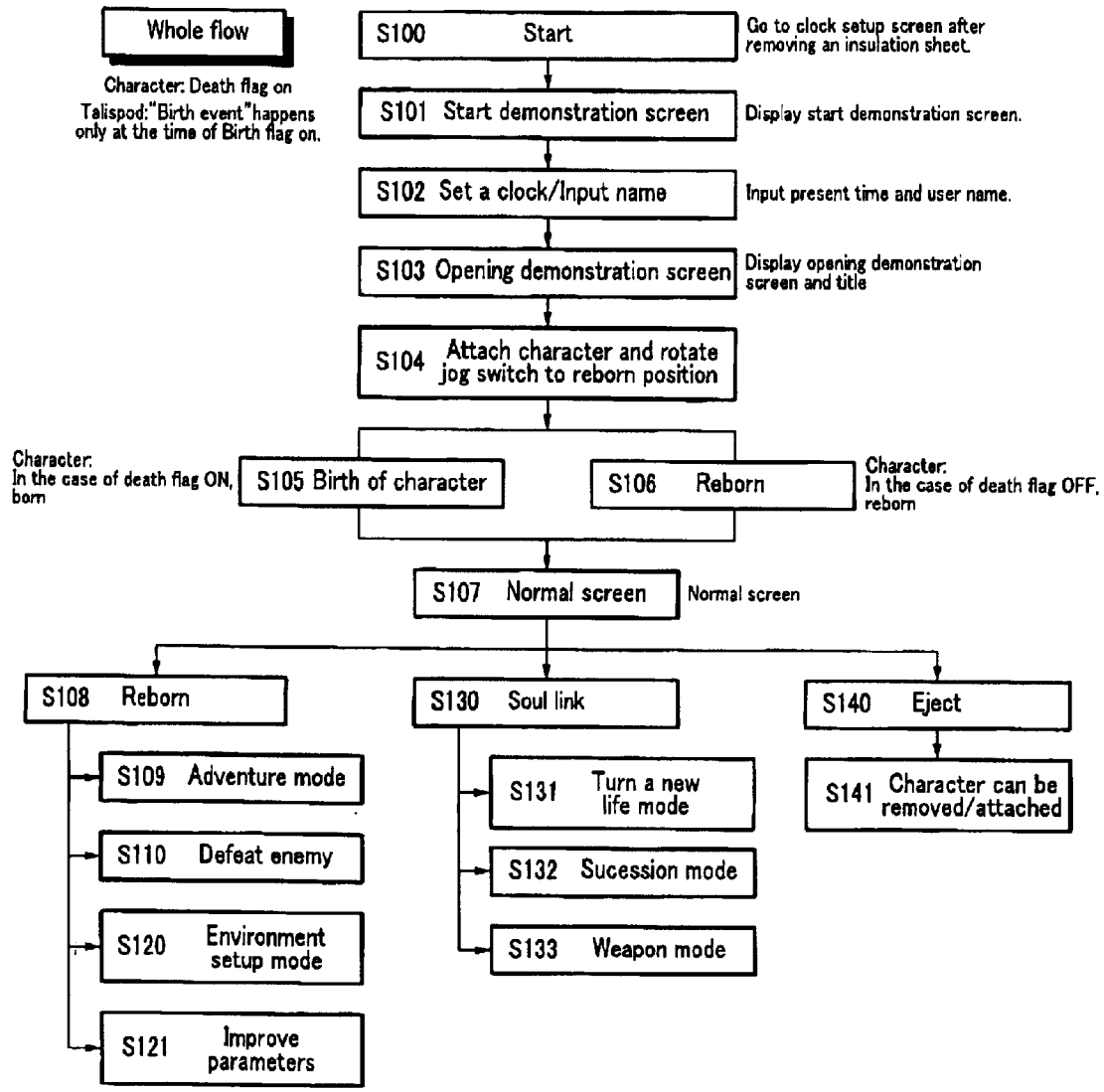
FIG. 4 is a whole process flowchart of a rearing game in the present invention.

A whole process flowchart will be explained by FIG. 4. S100 is a start that a power supply is turned on when a player remove an insulation sheet from a power supply portion of the game apparatus. When a power supply has turned on, the process proceeds to S101. In S101, start demonstration screen is displayed. Next step is S102, in the step the player sets a clock/inputs name to the timer or clocking means 13. After the input, the process proceeds to S103. In S103, opening demonstration screen and game title screen are displayed. In addition, S103 is displayed when the doll body 2 is not connected. After that, the process proceeds to S104. In S104, when the player connects the doll body 2 and sets a jog switch to "Reborn", the process proceeds to next step S105. In S105, when a character that stored in storage means 2a has been dead, parameters of the character changes to initial values by basic values stored in the storage means 2a and the process proceeds to S107. In the case S106 that a character is not dead, the process proceeds to S107. In S107, normal screen is displayed, wherein "Reborn" or "Eject" are selected by rotating jog switch 10a. The process proceeds to S108 "Reborn" or S140 "eject" by position of the jog switch 10a. In addition, when the game apparatus can be connected a plurality of doll bodies, the process can proceeds to S130 "soul link".

In S108, the process proceeds when position of the jog switch is "Reborn", wherein a player selects "Adventure mode": S109 or "Environment set up mode": S120. When the player selects "Adventure mode": S109, the process proceeds to S110, wherein the player fights with enemy monsters appeared. When the fight has finished, the process returns to the normal screen: S107. On the other hand, when player selects "Environment set up mode": S120, the process proceeds to S121. In S121, parameters of reared character is increased or decreased after that, the process proceeds to the normal screen: S107. In S104, the game has been finished; the player can remove the doll body 2 from the game apparatus in next S141. When the doll body 2 is removed, the process returns to S103: opening demonstration screen. On the other hand, when the process proceeds to S130: "Soul link", the player can select and proceeds to S131: "Turn a new life" or S132: "Succession mode" or S133: "Weapon mode". After that the player finished S131: "Turn a new life" or S132: "Succession mode" or S133: "Weapon mode", the process returns to S107: normal screen.

"Reborn", "Adventure mode", "Environment setting mode", "Soul link", "Turn a new life", "Succession mode" and "Weapon mode" will be explain in the following.

"Reborn" will be explained as the following. "Reborn" is play mode; wherein the player can selects "Adventure mode" or "Environment set up mode". Next "Eject mode" will be explained as the following. In "Eject mode", the doll body 2 is removed, wherein parameters stored in the storage means 2a cannot be damaged by removed the doll body 2. "Reborn" and "Eject" can be selected by rotating a jog switch. At the game apparatus described in FIG. 2, a jog switch is fixed rotatable on outside of the game apparatus. The player can select mode type by rotating the jog switch. On the other hand, at the game apparatus described in FIG. 3, a jog switch is fixed slidable on one side of the game apparatus, wherein the player can select mode type by sliding the jog switch.

"Adventure mode" will be explained as the following. In this mode, a player goes to shrines of each place in the world, wherein the mode purpose is knocking down boss of shrines by player's reared character. At first weak enemy monsters appear, a player knocks down the enemies. Appeared enemy monsters is stronger gradually, at last boss appears. When a player's character has knocked down the boss, the shrine has been cleared. When bosses of each place in the world have been knocked down, a final shrine appears; the game has finished by the boss of the shrine knocked down. In "Adventure mode", the player enjoys the story line as described above, in addition confirms own character reared stronger by fighting. For example, a player confirms strength of own character by ability points and skill of own character.

"Environment set up mode" will be explained as the following. In "Environment set up mode", ability points are decided by environment set up time and environment set Lip values (amount of water, temperature and amount of light). After one hour clocked has passed at maximum by time and clocking means, the environment set up has finished. In environment set up time, the player character is reared. In addition, ability points parameters of player character increases or decreases by events in the game progress condition. The longer time start to finish of environment set up is, the bigger amount of parameters increased or decreased becomes. On the other hand, the player character is leaned ability (a skill) by once environment set up. This ability has decided in advance by amount of water, temperature and amount of light of environment set up. For example, in the case of "Temperature is 35 degree C" and "Amount of water 5%", the player character is leaned "Double attack".

The player character is set to increase or decrease own ability points in advance by rearing results of environment set up. The player character has own suitable environment as shown in FIG. 14, though the player character can be set each 22 environment. For example, when the player character is "Salamander", an environment: "Dryness zone" is suitability "A"; the player character increases own ability points. On the other hand, In the case an environment is "Extreme cold zone", the environment is suitability "D"; the player character decrease own ability points. A pinpoint rearing will be explained as following. For example, in the case an environment of "Salamander" is "Dryness zone", when the player sets "Temperature is 35 degree C", "Amount of water is 5%", the rearing results increase ability points more than suitability "A". As described above, though ability points increase by rough environment set up, a pinpoint environment set up most increases ability points. The player can enjoy looking for a pinpoint environment set up for own character.

In the case of connecting and rearing plurality of doll bodies at the same time, player characters can learn team ability by combination of doll body and common environment set up time. FIG. 15 is a list of team ability. When a plurality of doll bodies is connected by the same combination as rearing combination, they can fight corporately and use team ability. This team ability as skill is stronger than normal skill. The player can enjoy looking for team ability by rearing various combination of doll body. Even though a combination of doll body looks disadvantage, said player characters can use leaned strong team ability as making up for lost ability points of them. In addition, the player can enjoy building of combination of skill.

"Soul link" will be explained by FIG. 8. "Soul link" includes "Tun a new life", "Succession" and "Weapon mode". An embodiment will be explained at a rearing game apparatus capable of connection with three doll bodies. When three doll bodies are connected, doll bodies which "Turn a new life", "Succession" and "Weapon mode" moved to, are connected with center connection means for connecting with doll body; an original doll body is connected with other connection means. On the other hand, at the game apparatus comprising only one connection means for connecting with doll body, at first an original doll body is connected, next doll body which an original doll boy moves to, is connected one after another.

In "Turn a new life mode", said player character which has been dead in the life, ability points of make to succeed to another character. As described in FIG. 8, one-tenth ability points during the lifetime of dead character can be added to basic values of another dead character. As a character made to do "Turn a new life" has already had some ability points when the character is born, said player character can proceed a game advantageously. In addition, ability points of an original character of "Turn a new life" back to basic values, the character is born in condition capable of rearing again.

"Succession mode" will be explained by FIG. 9. In "Succession mode", class of player characters can succeed to another character. As shown FIG. 9, each classes of two succession original characters are "2" and "4", a class of another character succession moved to, is that "2" plus "4" equal "6". Wherein, "Succession" original character is in dead condition.

"Weapon mode" will be explained by FIG. 10. When siad player character moves to "Weapon mode", another player character can learn a new skill as ability. As shown FIG. 10, the player can make another character to learn various skill with responding to own character rearing conditions. Wherein, "Weapon mode" original character is in dead condition.

As described above, the player can succeed a part of ability point and skill of reared character in constant term (in the life) to another character by "Soul link". The player can rear stronger character; that improves playability. In addition, as the game has not ended by character death (by the life time), the player can enjoy the rearing game for a long time.

A flow of fight will be explained by FIG. 12 to 13. The player has to keep fifteen skill leaned by rearing, etc. as use commands during fight before fight. FIG. 11 shows minimum skill composition including base attack such as "Small attack", "Middle Attack", "Strike attack". "Magic attack", "Light attack", "Darkness attack", "Counter attack", "Healing attack", etc. in addition, the skill includes some skill as team ability, by "Weapon mode" of "Soul link", and by "Environment set up". The player uses three commands by the fifteen skill in one turn the fight is finished in maximum five tunas. When the player character and an enemy character hit points are not "0" in final tun, said character that has more hit points, wins.

Figure 5:
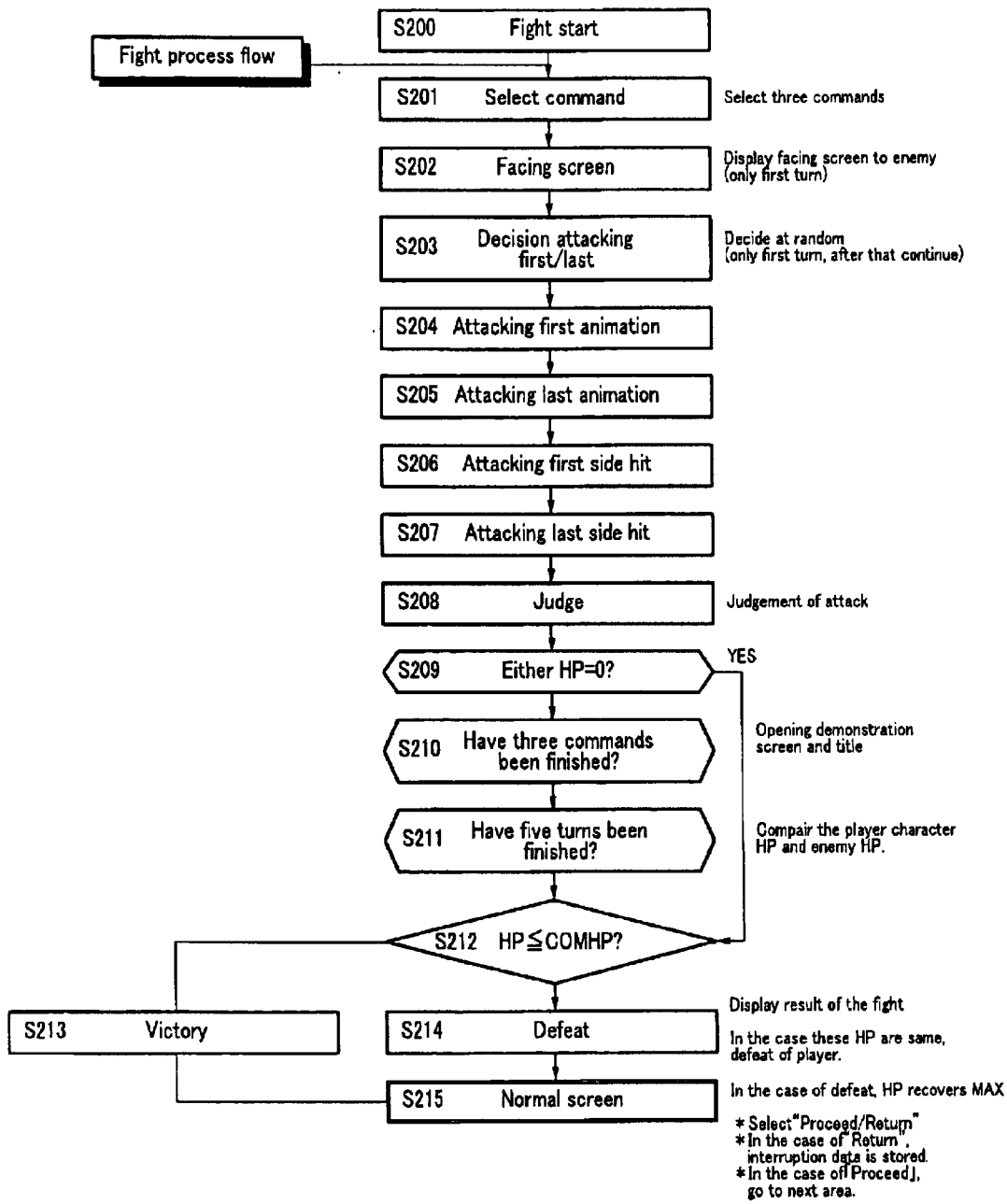
FIG. 5 is a fighting process flowchart of a rearing game in the present invention.

A flow chart of fight is shown in FIG. 5. In S200, a fight starts, the fight process proceeds to S201. In S201, the player selects three skill prepared in advance by command select, when the player has finished to select commands, the fight process proceeds to "S202". In S202, a screen that the player character faces an enemy character is displayed; when the screen has been finished, the fight process proceeds to S203. In S203, attacking first or last between the player character and an enemy character is decided. In apparatus attacking first or last is decided random and kept in all of turns until the fight finish. Next, the fight process proceeds to "S204", animation of attacking first is displayed, and then the fight process proceeds to S205. In S205 and S206, animation that attack skill from attacking last side hits on attacking first character is displayed, as well as in S207, animation that attack skill from attacking last side hits on attacking first character. Next, the fight process proceeds to S208. In S208, amount of damage to an enemy is decided by strike attack strength, modified value of skill, etc.; each character hit points decrease minus the amount of damage. In next S209, it is judged whether hit points of the player character or an enemy are "0" or not. In the case, either hit points is under "0", the fight process proceeds to S210. In S210, it is judged whether the player has finished one turn by using three commands or not. If the player has finished one turn, the fight process returns to S204, otherwise the process proceeds to S211.

In S211, it is judged whether the player has finished five turns. If the player has not finished five turns, the fight process returns to S201; the player can select commands again. As skill already used cannot be reused, the player has to examine combination of fifteen skill before fight start therefore it improves playability. Otherwise, if the player has finished five turns, the process proceeds to S212. In S212, it is calculated that the player how many hit points character and an enemy character remain compared with each maximum hit points. For example, When a player character's remained hit points is 24% and an enemy character's remained hit points is 12%, the player character has more hit points percent of maximum than the enemy character, therefore the player character has a victory. Otherwise, when both player character and enemy character have same hit points percentage, the player character is defeated. In the case of victory, the fight process proceeds to S213, in the case of defeat, the fight process proceeds to S214. In S213 and S214, each results are displayed, after that the process proceeds to S215 and returns to Normal screen. In addition, defeat of the player character is decided, when a player selects "Return" in select "Proceed/Return", parameters are written in a storage means 2a of a doll body 2. Otherwise, when the player selects "Proceed", the process proceeds to next area.

Attributes will be explained. All skill and characters have attributes such as "Fire", "Earth", "Wind", "Water", "Light" and "Darkness". Skill have also attributes that "Fire" equals to "Magic attack", "Earth" equals to "Strike attack", "Wind" equals to "Counter", "Water" equals to "Healing magic", "Light" equals to "Light attack" and "Darkness" equals to "Darkness attack". In addition, "Water" is stronger than "Fire" and weaker than "Wind"; "Fire" is stronger than "Earth" and weaker than "Water"; "Earth" is stronger than "Wind" and weaker than "Fire"; "Wind" is stronger than "Water" and weaker than "Earth"; "Fire", "Earth", "Wind", "Water" are stronger than "Light" and weaker than "Darkess".

Deference in the case of fighting with a plurality of doll boies will be explained. When a plurality of doll bodies is used, the fight process flow is the same as described above. In a plurality of doll bodies fight, a leader player character and other support player character are formed. When player characters attack, support characters attack additionally based on own parameters and attributes. For example, when a leader character executes "Magic attack" and one of support characters has "Fire" attribute, the support character execute additional attack because "Magic attack" equals to "Fire" attribute. Otherwise, when the leader character executes "Strike attack (Earth)" and one of support characters has "Earth" attribute, the support character execute additional attack. The player has to examine skill attributes and a plurality of character's attributes, and make support characters attributes to correspond to fight skill attributes in order to fight advantageously.

When a plurality of doll bodies fight and they have already learned skill as team ability by reared, they can use the skill at same rearing combination fight. This skill is more effective than normal skill.

A communication fight will be explained. When two game apparatuses 1 are connected with each other by a connection means 20, the player can make to fight own character with opposite player's character. How to make own character to fight with opposite character is the same as in the case of enemy characters, the player selects in fifteen skill opposite character learned; uses three commands (skill) in one turn which the player finished fight in maximum five turns. When hit points of either player character or opposite character is under "0" halfway, the fight is finished.

As described above, preferred embodiments are explained. In this invention, a rearing game apparatus that the player can change rearing environment freely and rear a plurality of characters at the same time is provided. In this way, it is the ideal rearing game that the player can shorten a rearing term and make own characters to learn various abilities by combination of them.

What is claimed is:

1. A rearing game apparatus comprising a display means for displaying a rearing information on a display according to game progress conditions; an input means for inputting an operation of a player; a storage means for storing information regarding game progress conditions, character parameters wherein character parameters include skills, graphics and temporary information; an environment set-up means for setting up a character rearing environment at least one connection means for connecting the rearing game apparatus to at least one character doll body having a storage means; a control means for controlling reception and transmission of information between said rearing game apparatus and said at least ohe character doll body whereby said parameter information may be recorded to said storage means associated with said doll body; and whereby a change of character rearing information may be recorded to said storage means associated with said doll body.

2. The rearing game apparatus set forth in claim 1, wherein a plurality of the character doll bodies are connected to a plurality of the connection means, and wherein the plurality of said character doll bodies are reared at the same time.

3. The rearing game apparatus as set forth in claim 2, wherein all the skills of the plurality of characters are added up and the parameters of the characters are changed in accordance with combination of characters connected to the rearing game apparatus and the passage of rearing time.

4. The rearing game apparatus as set forth in claim 1, further comprising a connection means for connecting with another game apparatus, whereby a competition game is made when both apparatuses are connected to one another.

* * * * *